United States Patent
Boinard et al.

(10) Patent No.: US 7,621,750 B1
(45) Date of Patent: Nov. 24, 2009

(54) ANTI-GLARE PROPERTIES OF POLARIZED LENS DEMONSTRATION DEVICE AND ASSOCIATED METHODS

(75) Inventors: Eric Boinard, Glasgow (GB); Pascal Boinard, Glasgow (GB); Andrew Suszko, Ormond Beach, FL (US)

(73) Assignee: Stylemark, Inc., Ormond Beach, FL (US)

( * ) Notice: Subject to any disclaimer, the term of this patent is extended or adjusted under 35 U.S.C. 154(b) by 109 days.

(21) Appl. No.: 12/045,976

(22) Filed: Mar. 11, 2008

(51) Int. Cl.
 *G09B 25/00* (2006.01)
(52) U.S. Cl. .................. 434/365; 351/232; 359/601; 434/399
(58) Field of Classification Search .................. 359/493
 See application file for complete search history.

(56) References Cited

U.S. PATENT DOCUMENTS

| | | | |
|---|---|---|---|
| 2,301,126 A | 11/1942 | Kriebel | |
| 2,302,556 A | 11/1942 | Kriebel | |
| 2,321,915 A * | 6/1943 | Higley | 351/233 |
| 3,567,309 A | 3/1971 | Jasgur | |
| 3,684,355 A * | 8/1972 | Molner | 351/243 |
| 3,711,182 A | 1/1973 | Jasgur | |
| 3,962,802 A | 6/1976 | Kane | |
| 4,209,822 A | 6/1980 | Goodbar | |
| 4,764,007 A * | 8/1988 | Task | 351/243 |
| 5,007,730 A * | 4/1991 | McAllister et al. | 351/243 |
| 5,797,050 A | 8/1998 | Smith | |
| 5,969,792 A * | 10/1999 | Ginsburg | 351/243 |
| 6,073,782 A * | 6/2000 | Ascik | 211/85.1 |
| 6,099,126 A * | 8/2000 | Teskey | 351/213 |
| 6,113,238 A | 9/2000 | Balch et al. | |
| 6,808,394 B1 | 10/2004 | Bentley | |
| 2003/0103261 A1 | 6/2003 | Hay | |
| 2004/0145729 A1* | 7/2004 | Verfel | 356/124 |
| 2007/0081256 A1 | 4/2007 | Travers | |
| 2008/0124699 A1* | 5/2008 | Reiber | 434/428 |

* cited by examiner

*Primary Examiner*—Lee Fineman
(74) *Attorney, Agent, or Firm*—Allen, Dyer, Doppelt, Milbrath & Gilchrist, P.A.

(57) ABSTRACT

A device and display for demonstrating glare reduction by a polarized lens includes an array of vertically spaced-apart, parallel, transparent elements. Rays of light polarized in a first dimension are directed onto the array from above. An indicium is positioned behind the array. A reflective surface is positioned adjacent a bottom of the array. A polarized lens having a polarization opposed to the first dimension is interposable between a viewer's eye and the array. In use, rays from the polarized light source impinge upon the array, partially pass to the reflective surface and are partially reflected onto the indicium via glare off the array. Rays reflected by the reflective surface are reflected by the array via glare toward the viewer's eye, and rays reflected by the indicium pass thorough the array toward the viewer's eye. An interposition of the polarized lens shields the viewer's eye from the glare.

19 Claims, 3 Drawing Sheets

ANTI-GLARE PROPERTIES OF POLARIZED LENS DEMONSTRATION DEVICE AND ASSOCIATED METHODS

BACKGROUND OF THE INVENTION

1. Field of the Invention

This invention is directed to devices for demonstrating the effects of polarizing lenses, and, more particularly, to such devices for use in marketing sunglasses having polarized lenses.

2. Related Art

Glare caused by the reflection of light off surfaces such as roads, windows, snow, or water can be significantly reduced by polarized lenses, allowing safer operation of motor vehicles as well as minimization of eye fatigue over long periods of exposure. Such lenses are present in products marketed as polarized sunglasses.

Polarized sunglasses reduce glare by allowing transmission of the vertical component of the reflected light, and by blocking the mainly horizontal component of the light reflected from surfaces.

The reduction in glare by polarized lenses can be significant, but the demonstration of their benefits to members of the public can be difficult. This difficulty can be enhanced by the absence of trained personnel and by the lack of glare in most retail environments. The combination of these factors makes the marketing of polarized sunglasses problematic and creates the need for an adequate demonstration device that can be used in sales and marketing locations such as shops, exhibition stands, mall kiosks, etc., for allowing customers to readily experience the ability of polarized lenses to reduce or eliminate glare.

Previous attempts to demonstrate the benefits of polarized lenses in reducing glare have been made. Devices such as glare-producing view boxes, wherein the customer is asked to look at a graphic through a clear pane of transparent material, have been developed. The demonstration is based on the generation of glare on the clear pane. This is achieved with a variable degree of success as a function of the glare demonstrator design. The glare is reduced or eliminated when the viewer wears polarized sunglasses, allowing him or her to observe the graphic located behind the glare pane. A limitation of such systems is that the size of the graphic dictates the depth and overall size of the device and in a retail environment, where space is at a premium, large versions of such glare boxes would be cost prohibitive. These demonstrators also require shielding of the glare pane from unpolarized ambient light in order to exhibit their full potential.

Another type of glare demonstrator uses a polarizing film similar to films used on computer screens and other display devices. This system relies on the angle between the unpolarized light source, the surface of the film, and the eye of the observer. For this reason, in a general retail environment and to be most effective, a large-scale version of this demonstrator would require a significant amount of space in an environment where space is at a premium.

Demonstrators of the type described above can be useful to demonstrate the benefits of polarized lenses once the customer has entered the retail space and asked for information, but are not of sufficient size to be effective in attracting the customer in the retail space in the first place.

A need, therefore, exists for a glare demonstrator that can be of sufficient size to attract the customer, yet sufficiently compact for a retail setting, whose efficacy to demonstrate glare is not affected by unpolarized ambient light and that is sufficiently easy to use so that the customer can see the effect of polarizing lenses without the need for trained personnel.

SUMMARY OF THE INVENTION

The present invention is directed in a particular embodiment to a device for demonstrating the reduction of glare by a polarized lens. The device comprises an array of vertically spaced-apart, substantially parallel, substantially transparent elements. The array elements are oriented at an angle to the horizontal in a range between 30 and 60 degrees, the angle being distinct from a Brewster's angle of the transparent elements.

Means are provided for directing rays of light polarized in a first unitary dimension onto the array from a first end thereof. An indicium is positioned behind the array, and can be at least partially lighted by ambient light. A reflective surface is positioned adjacent a second end of the array opposite the first end. A polarized lens is interposable between an eye of a viewer in front of the array and the array, a polarization of the lens substantially opposed to the first unitary dimension.

In use, rays from the source of polarized light can impinge upon the array, partially pass therethrough to the reflective surface and partially be reflected onto the indicium via glare off the array. Rays reflected by the reflective surface are partially reflected by the array via glare thereoff toward the viewer's eye, and rays reflected by the indicium partially pass thorough the array toward the viewer's eye. An interposition of the polarized lens serves to shield the viewer's eye at least partially from the glare from the indicium and from the reflective surface.

The glare demonstrator can be of a size significantly large to attract the customer, but can have a shallow depth. The device can be hung on a wall or placed at the back of a worktop to minimize space usage. The device is intuitively easy to use, thus reducing the need for trained personnel, and it creates a veiling glare across a displayed graphic when it is viewed directly. The indicia, however, can be seen clearly when it is viewed through polarizing lenses, providing a dramatic experience of the phenomenon of glare reduction to the observer and therefore demonstrating the benefits of polarizing lenses.

The invention also contemplates a method of demonstrating the reduction of glare by a polarized lens, and also a polarized sunglass display that incorporates the glare demonstration device.

The features that characterize the invention, both as to organization and method of operation, together with further objects and advantages thereof, will be better understood from the following description used in conjunction with the accompanying drawing. It is to be expressly understood that the drawing is for the purpose of illustration and description and is not intended as a definition of the limits of the invention. These and other objects attained, and advantages offered, by the present invention will become more fully apparent as the description that now follows is read in conjunction with the accompanying drawing.

DETAILED DESCRIPTION OF THE INVENTION

Figure 1:
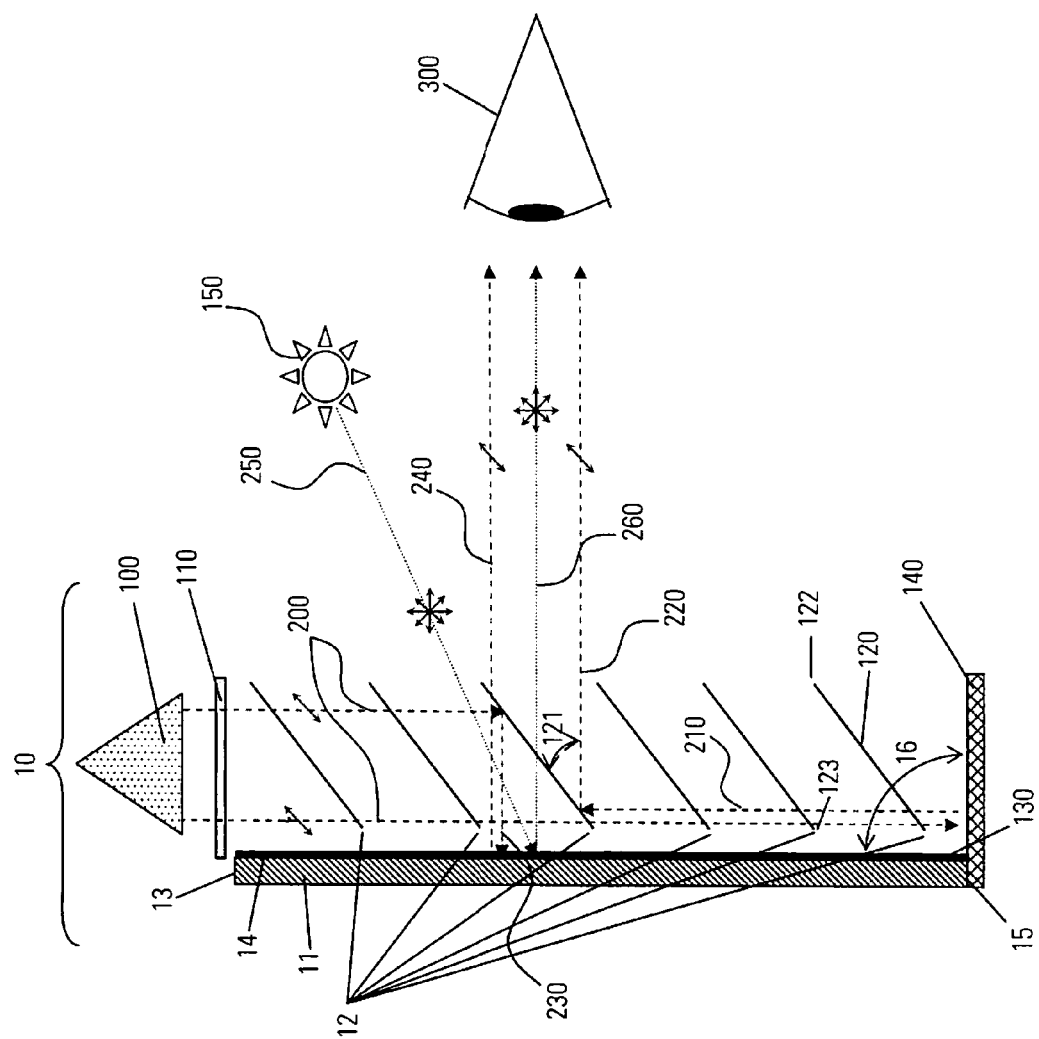
FIGS. 1 and 2 are schematic, cross-sectional views of the glare demonstrator of the present invention, without (FIG. 1) and with (FIG. 2) the interposition of a polarized lens between the viewer's eye and the indicia.
Figure 2:
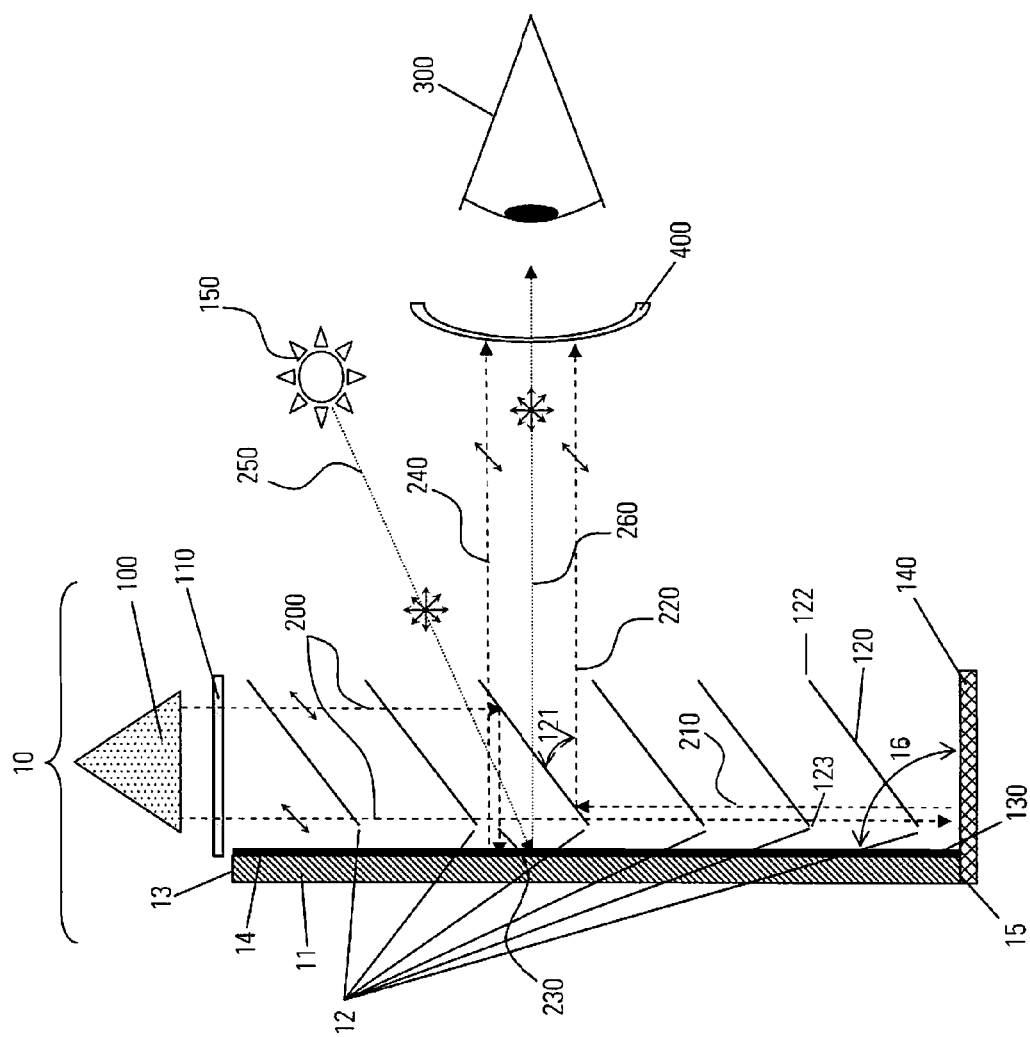
Figure 3:
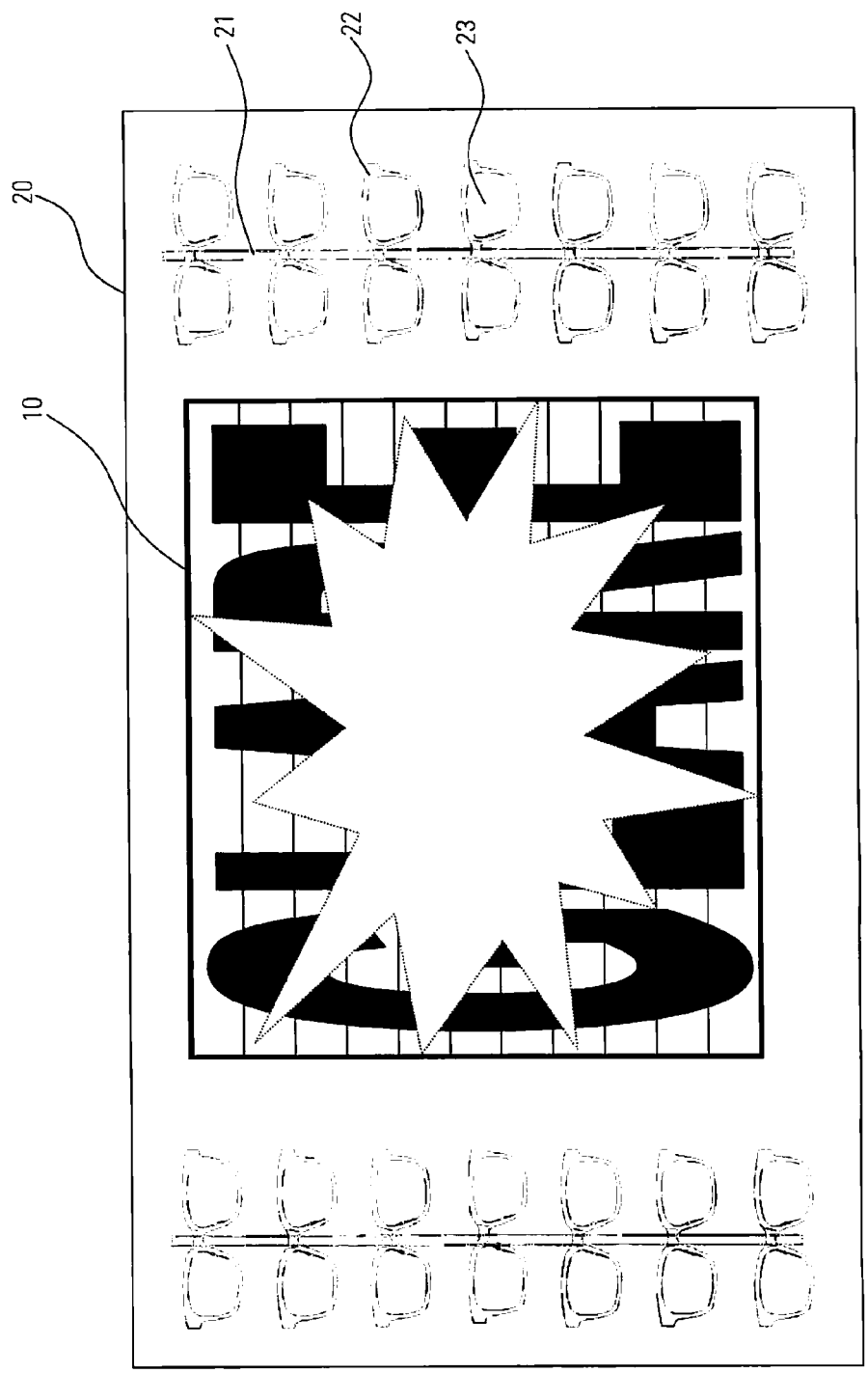
FIG. 3 is a schematic front view of a sunglass display incorporating the device of FIGS. 1 and 2.

A description of the preferred embodiments of the present invention will now be presented with reference to FIGS. 1-3.

The present invention is directed in a particular embodiment to a device 10 for demonstrating the reduction of glare by a polarized lens 400. The device 10 comprises a base 11 to which are affixed an array 12 of vertically spaced-apart, substantially parallel, substantially transparent elements 120. The array elements 120 can comprise sheets of material, for example, an organic material such as plastic, or a glass, that has a refractive index different from that of air, such as in a range of 1.1 to 2.2, and preferably in a range of 1.4 to 1.6.

The array elements 120 are oriented at an angle 121 to the horizontal in a range between 30 and 60 degrees, and preferably in a range between 43 and 47 degrees. The angle 121 is preferably distinct from a Brewster's angle of the array elements 120. In a particular embodiment, a top edge 122 of each array element at least partially vertically overlaps a bottom edge 123 of an upwardly adjacent array element 120, which prevents light from passing directly to a viewer's eye 300 from the base 11.

Means are provided for directing rays of light 200 that are polarized in a first unitary dimension (e.g., horizontally) onto the array 12 from a first end thereof, here the top end 13. The light-directing means can comprise, for example, a source of unpolarized light 100, such as, but not intended to be limited to, an LED or a fluorescent, halogen, or incandescent light, positioned atop a polarizing film 110.

An indicium 130 is positioned behind the array 12, for example, on a back wall 14 of the base 11. The indicium 130 can be at least partially lighted by rays 250 of ambient light 150. The indicium 130 can comprise any sort of visual medium, such as a photograph, drawing, text, or other indicia known in the art.

A reflective surface 140 is positioned adjacent a second end of the array 12, here the bottom end 15, opposite the top end 13. The reflective surface 140 is oriented at an angle 16 in the range of 60 to 120 degrees, and preferably between 85 and 95 degrees, to the vertical.

A polarized lens 400, which can comprise a lens of a pair of sunglasses, is interposable between the viewer's eye 300 when in front of the array 12 and the array 12. The lens's polarization is substantially opposed to the first unitary dimension (e.g., vertical).

In use, rays 200 from the source of polarized light 100,110 can impinge upon the array 12, partially pass therethrough to the reflective surface 140, and partially be reflected 230 onto the indicium 130 via glare off the array 12. Rays reflected by the reflective surface 140 are partially reflected 210 by the array 12 via glare thereoff toward the viewer's eye 300, and rays 240 reflected by the indicium 130 partially pass thorough the array 12 toward the viewer's eye 300. An interposition of the polarized lens 400 serves to shield the viewer's eye 300 at least partially from the glare from the array 12, the indicium 130, and from the reflective surface 140.

The separation of light is achieved by (1) not setting the angle 121 of the array elements 120 at the Brewster's angle of the materials constituting the array elements 120 and (2) ensuring that the polarized incident light 200 is transmitted through two media of different refractive indexes. In a specific embodiment, air and an organic material are used. Different materials with different refractive indexes that perform in accordance with the above description can be used as the array elements 120.

Thus, referring to FIG. 2, when a polarized lens 400 is placed between the viewer's eye 300 and the array elements 120, the polarized reflected light 240, from the visual indicia 130, and the polarized reflected light 220, from the array elements 120, is blocked. The viewer can then see clearly the visual indicia 130, illuminated by the ambient unpolarized light 250 generated by the ambient unpolarized light source 150. The reduction of glare, hence the effectiveness of the device 10, is at its maximum when the axis of polarization of the polarized incident light 200 is at 90° of the axis of polarization of the polarizing lens 400.

The present invention is also directed to a method for demonstrating the reduction of glare by a polarized lens. The method comprises directing rays of light polarized in a first unitary dimension onto a first end of an array 12 as described above. Light that is reflected via glare off the array 12 from the indicium 130 and from glare reflected by the reflective surface 140, along with the indicium 130. A polarized lens 400 is interposed between the viewer's eye 300 and the array 12. Then the indicium 130 is viewed, wherein the viewer's eye 300 is at least partially shielded from the glare from the indicium 130 and from the reflective surface 140.

Another aspect of the invention is directed to a polarized sunglass display 20 (FIG. 3). The display 20 comprises a device 10 as described above for demonstrating the reduction of glare by a polarized lens. The display 20 further comprises a display element 21 that is adapted to support a pair of sunglasses 22 having polarized lenses 23. The sunglasses 22 are wearable by a viewer, and are interposable between the viewer and the array 12, thereby easily permitting the viewer to be aware of the effect of the polarization of the sunglass lenses 23 on glare reduction.

In the foregoing description, certain terms have been used for brevity, clarity, and understanding, but no unnecessary limitations are to be implied therefrom beyond the requirements of the prior art, because such words are used for description purposes herein and are intended to be broadly construed. Moreover, the embodiments of the device, method, and display illustrated and described herein are by way of example, and the scope of the invention is not limited to the exact details of construction or use.

Having now described the invention, the construction, the operation and use of preferred embodiments thereof, and the advantageous new and useful results obtained thereby, the new and useful constructions, and reasonable mechanical equivalents thereof obvious to those skilled in the art, are set forth in the appended claims.

What is claimed is:

1. A device for demonstrating the reduction of glare by a polarized lens comprising:
    an array of vertically spaced-apart, substantially parallel, substantially transparent elements, oriented at an angle to the horizontal in a range between 30 and 60 degrees, the angle distinct from a Brewster's angle of the array elements;
    means for directing rays of light polarized in a first unitary dimension onto the array from a first end thereof;
    an indicium positioned behind the array;
    a reflective surface positioned adjacent a second end of the array opposite the first end; and
    a polarized lens interposable between an eye of a viewer in front of the array and the array, a polarization of the lens substantially opposed to the first unitary dimension;
    wherein rays from the source of polarized light can impinge upon the array, partially pass therethrough to the reflective surface and partially be reflected onto the indicium via glare off the array; rays reflected by the reflective surface partially reflected by the array via glare thereoff toward the viewer eye; rays reflected by the indicium partially passing thorough the array toward the viewer eye; an interposition of the polarized lens serving to shield the viewer eye at least partially from the glare from the indicium and from the reflective surface.

2. The device recited in claim 1, wherein over a range of heights of the viewer eye, a top edge of each array element at least partially vertically overlaps a bottom edge of an upwardly adjacent array element.

3. The device recited in claim 1, wherein the array elements comprise sheets of material having a refractive index different from a refractive index of air.

4. The device recited in claim 3, wherein the array elements refractive index is in a range of 1.1 to 2.2.

5. The device recited in claim 3, wherein the array element angle is in a range of 43 to 47 degrees.

6. The device recited in claim 1, wherein the light directing means comprises a polarizing film positioned between a source of unpolarized light and the array.

7. The device recited in claim 1, wherein the reflecting surface is oriented at an angle in a range of 60 to 120 degrees to the vertical.

8. The device recited in claim 1, wherein the polarized lens comprises a lens of a pair of sunglasses.

9. The device recited in claim 1, wherein the first polarization dimension comprises a horizontal polarization and the lens polarization comprises a vertical polarization.

10. A method for demonstrating the reduction of glare by a polarized lens comprising:
    directing rays of light polarized in a first unitary dimension onto a first end of an array of vertically spaced-apart, substantially parallel, substantially transparent elements, oriented at an angle to the horizontal in a range between 30 and 60 degrees, the angle distinct from a Brewster's angle of the array elements;
    viewing light reflected via glare off the array from an indicium positioned behind the array and from glare reflected by a reflective surface positioned adjacent a second end of the array opposite the first end;
    interposing a polarized lens between an eye of a viewer in front of the array and the array; and
    viewing the indicium, wherein the viewer eye is at least partially shielded from the glare from the indicium and from the reflective surface.

11. The method recited in claim 10, wherein the light directing comprises positioning a polarizing film between a source of unpolarized light and the array.

12. The method recited in claim 10, wherein the polarized lens interposing comprises donning a pair of sunglasses having polarized lenses.

13. The method recited in claim 12, wherein the first polarization dimension comprises a horizontal polarization and the lens polarization comprises a vertical polarization.

14. A polarized sunglass display comprising:
    a device for demonstrating the reduction of glare by a polarized lens comprising:
    an array of vertically spaced-apart, substantially parallel, substantially transparent elements, oriented at an angle to the horizontal in a range between 30 and 60 degrees, the angle distinct from a Brewster's angle of the array elements;
    means for directing rays of light polarized in a first unitary dimension onto the array from a first end thereof;
    an indicium positioned behind the array; and
    a reflective surface positioned adjacent a second end of the array opposite the first end; and
    a display element adapted to support a pair of sunglasses having polarized lenses wearable by a viewer, the sunglasses interposable between the viewer and the array, a polarization of the lens substantially opposed to the first unitary dimension;
    wherein rays from the source of polarized light can impinge upon the array, partially pass therethrough to the reflective surface and partially be reflected onto the indicium via glare off the array; rays reflected by the reflective surface partially reflected by the array via glare thereoff toward the viewer eye; rays reflected by the indicium partially passing thorough the array toward the viewer eye; an interposition of the polarized lens serving to shield the viewer eye at least partially from the glare from the indicium and from the reflective surface.

15. The display recited in claim 14, the demonstrating device is positionable so that, over a range of heights of the viewer eye, a top edge of each array element at least partially vertically overlaps a bottom edge of an upwardly adjacent array element.

16. The display recited in claim 14, wherein the array element angle is in a range of 43 to 47 degrees.

17. The display recited in claim 14, wherein the light directing means comprises a source of unpolarized light and a polarizing film positioned between the light source and the array.

18. The display recited in claim 14, wherein the reflecting surface is oriented at an angle in a range of 60 to 120 degrees to the vertical.

19. The display recited in claim 14, wherein the first polarization dimension comprises a horizontal polarization and the lens polarization comprises a vertical polarization.

* * * * *